(12) United States Patent
Stewart et al.

(10) Patent No.: US 7,784,490 B1
(45) Date of Patent: Aug. 31, 2010

(54) VALVE MONITORING AND CONTROLLING SYSTEM

(75) Inventors: Ryall Stewart, Anza, CA (US); Robert Foresman, 26902 Paseo Cardero, San Juan Capistrano, CA (US) 92675

(73) Assignee: Robert Foresman, San Juan Capistrano, CA (US)

( * ) Notice: Subject to any disclaimer, the term of this patent is extended or adjusted under 35 U.S.C. 154(b) by 708 days.

(21) Appl. No.: 11/711,183

(22) Filed: Feb. 27, 2007

(51) Int. Cl.
*F16K 37/00* (2006.01)
(52) U.S. Cl. ............... 137/556; 137/554; 137/556.6; 251/129.04
(58) Field of Classification Search .............. 137/554, 137/556, 553, 556.6; 251/129.04
See application file for complete search history.

(56) References Cited

U.S. PATENT DOCUMENTS

| | | | | | |
|---|---|---|---|---|---|
| 5,269,343 | A | * | 12/1993 | Trapp | 137/554 |
| 5,505,428 | A | * | 4/1996 | De Moss et al. | 251/149.9 |
| 6,837,271 | B1 | * | 1/2005 | Saint | 137/553 |
| 6,945,509 | B2 | * | 9/2005 | Royse | 137/554 |
| 7,401,624 | B2 | * | 7/2008 | Heer | 137/554 |

* cited by examiner

*Primary Examiner*—Kevin L Lee
(74) *Attorney, Agent, or Firm*—G. Donald Weber, Jr.

(57) ABSTRACT

A valve monitoring system including at least one valve having a movable handle with an activator therein mounted adjacent to a support panel on which are disposed a plurality of sensor devices responsive to the activator and a separate indicator panel for displaying the position of the valve handle. The activator at the handle and the sensor devices interact to selectively indicate operational conditions of the valve. In addition, a motor can be used to move the handle, and reconfigure the valve, as desired.

17 Claims, 5 Drawing Sheets

VALVE MONITORING AND CONTROLLING SYSTEM

BACKGROUND

1. Field of the Invention

The system of this invention is directed to a monitoring system, in general, and to a monitoring system which monitors and indicates the operational status of one or more valves which may be remotely located, in particular.

2. Prior Art

There are many known applications for remotely controlled valves. One specific application is found in the boating industry. In this application, valves located within the hull of a boat are relatively inaccessible wherein the status thereof is not readily known at the bridge or helm location of the boat.

Unfortunately, the known system of remotely located valves in a boat is fraught with many shortcomings. In the existing systems, it frequently happens that the status or condition of the valve is not readily discernible to the boat operator. This situation can lead to many unpleasant and even disastrous results or events.

For example, many boats include through hull fittings which are located below the water line. These fittings are, typically, attached to hoses with hose clamps. However, because hoses and/or clamps have limitations on the structural integrity thereof, suitable valves are used as required by marine regulatory agencies.

However, these valves are usually mounted adjacent to the through-hull fittings and are, typically, located in the bowels of the boat. Consequently, these valves are accessible only with difficulty. As a practical matter, most boat operators often do not check out the status of these valves. Thus, an open valve can be a potential disaster in terms of flooding and, possible sinking, of the boat.

In like manner, it is also possible to overload a properly closed valve for example, in the cooling water intake line, when starting the engine or generator on a boat. This can lead to the burn-up of the engine or generator because of lack of cooling.

Likewise, it is possible to operate a pump or sewage macerator with the output valve closed. This can lead to the undesirable rupture of an on-board hose.

Thus, there are described a few of the problems which can occur due to a valve being in a position (whether open or closed) which cannot be easily detected from the helm or other remote locations.

SUMMARY OF THE INSTANT INVENTION

In this invention, a valve monitoring system includes at least one valve with a control handle movably mounted thereon. Disposed on the handle is an actuator such as a magnet, or the like, which interacts with a plurality of sensor devices, which are preferably Hall-effect switches. The sensor devices are mounted on a substrate which is mounted on the valve proximate to the rotational axis of the handle.

A display panel is mounted adjacent to the operator's station (such as the helm of a boat) or similar location. The display panel is connected to receive signals from the sensor devices.

The handle mounted activator and the selector devices interact to selectively establish operational or positional signals in the electrical system associated with the display panel so as to indicate the position of the handle and, thus, the status of the valve.

Related indicator lights on the display panel are selectively activated to inform/warn the operator of the operating conditions (or status) i.e., open or closed, of the various valves.

Besides identifying valve status, the system may also incorporate an interlock relay for selectively supplying power to a pump, for example. By connecting the interlock relay in series with the on/off switch that controls an associated piece of equipment, it can be assured that such piece of equipment is operable only when the valve is in the proper state.

Electric motor driven units are designed to remotely operate a valve through its open/closed positions by interconnection to the valve, typically, at the valve handle discussed above. The control for the motor is, typically, at or adjacent to the display panel. The status of the motor driven valve can also be monitored.

Thus, the "smart valve system" is created to permit an operator to know the condition or status of every valve of an apparatus at a glance from a convenient location and, in a preferred embodiment, to select the status of the valve.

DESCRIPTION OF A PREFERRED EMBODIMENT

Figure 1:
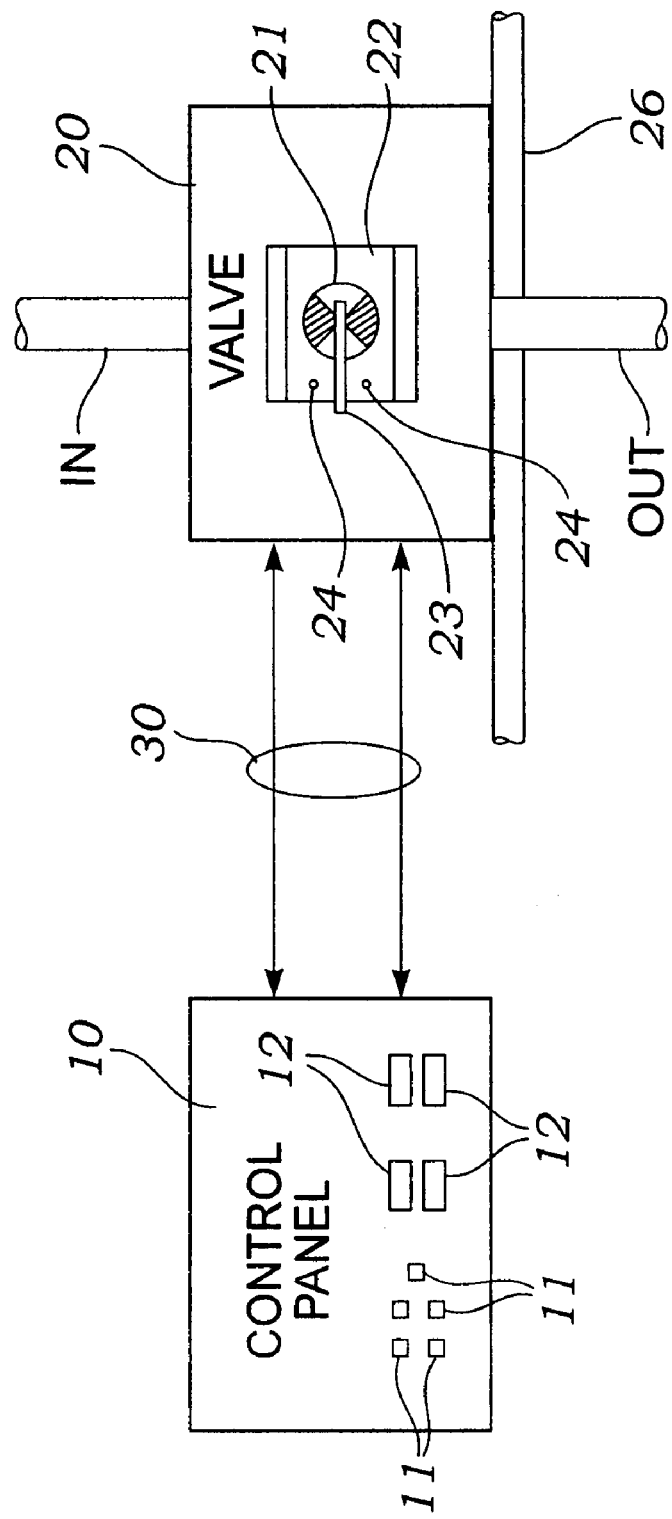
FIG. 1 is a schematic representation of a monitoring system in accordance with the instant invention.

Referring now to FIG. 1, there is shown, in block diagram form, a schematic representation of the system of the instant invention. The control panel 10 is of any suitable construction. The control panel, in one application is mounted at a suitable and desirable location as, for example, the helm or bridge of boat. However, the invention is not limited specifically to such an application.

The valve 20 (shown diagrammatically) is of any suitable construction. The valve, in one application, takes the form of a ball valve or the like fabricated of Marelon. The valve includes a movable component 21 which selectively permits passage of material therethrough from the inlet (IN) to the outlet (OUT) ports (or vice versa). The movable component 21 is manipulated by a controller 23 which is, typically, a handle or the like.

An optional motor or drive mechanism (see infra) may be connected to the controller (handle) for selectively manipulating the valve condition in response to a control signal from the control panel 10.

A sensor support 22 (described in detail hereinafter) is mounted adjacent to controller 23 at the valve 20. One or more sensors 24 are mounted on the sensor support 22. The sensors 24 are interactive with the controller 23 so as to be indicative of the position of the controller 23 and the movable component. Thus, the operational status of the valve can be monitored as a function of the controller 23.

As shown representatively, the valve 20 is mounted in a remote location relative to the control panel 10. In a preferred (but not limitative) application, the valve 20 is mounted to the hull 25 of a vessel in the manner of a through-hull valve.

The control panel 10 can be fabricated of any suitable material such as wood, fiberglass, plastic or the like. The control panel is disposed at any suitable location which is easily accessible to the operator of the apparatus (such as, but not limited to) a boat or the like. This control panel 10 can be incorporated into (or combined with) any other type of control panel which can supply power thereto and include power controllers, ignition switches or the like.

The control panel 10 includes one or more indicator devices 11 which take the form of lights which indicate the position of the valve. A preferred type of light is a light emitting diode (LED).

Other switches 12 are mounted on the panel 10. These switches 12 are used to control the operation of the valve 20 (when motor driven) and can be rocker-type switches, toggle switches or the like.

The control panel 10 and the valve 20 are interconnected by a cable 30. The cable 30 returns display control signals from the sensors 24 (as determined by the controller 23) to the control panel 10. The cable 30 can be used to supply power to the motor components of valve 20.

Figure 2:
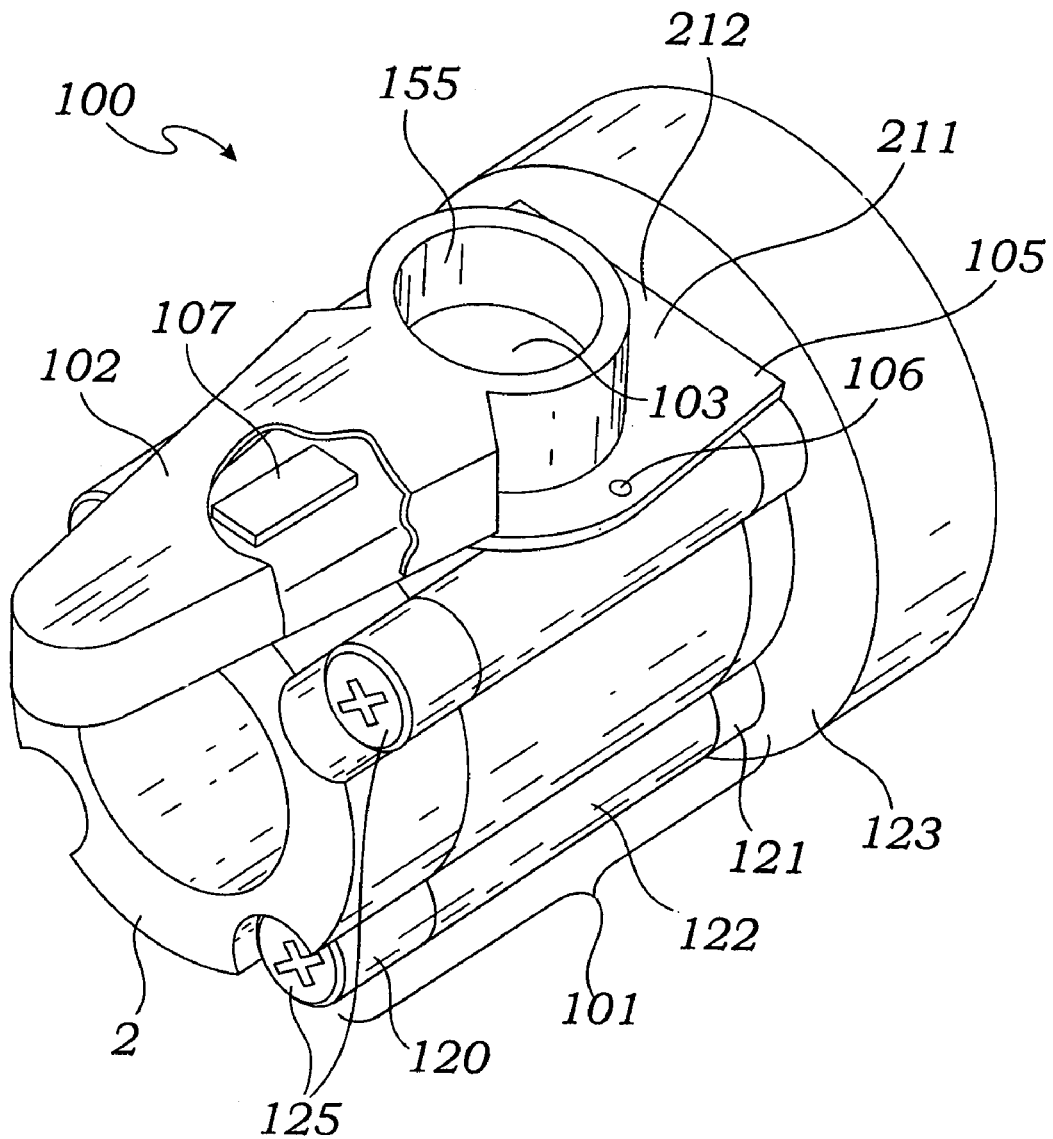
FIG. 2 is one view of a typical valve used in the instant invention including a rotatably mounted handle with an activator and a sensor support panel with sensor devices mounted thereon adjacent to the valve.

Referring now to FIG. 2, there is shown an oblique view of a representative valve 100 utilized in the inventive concept. It should be understood that the valve 100, per se, is known in the art and is, typically, mounted at a remote location in a boat hull or other application. The valve 100 (which is a more specific representation of valve 20 in FIG. 1) includes a housing 101 which can assume any appropriate configuration for containing any suitable valve control mechanism such as a ball valve or the like. The housing includes a top 120, a bottom 121 and a body 122 and a mounting flange 123, all of which are joined together by bolts 125. It is contemplated that housing 101 can be fabricated using other techniques.

A suitable valve positioning element such as handle 102 is movably mounted, for example, on an appropriate pivot arm 103 which extends within the body 122 of housing 101 to control the portion of the control element (not shown) in the valve.

A sensor board 105, fabricated of a fiberglass resin or the like, is, preferably, mounted on a suitable surface of the housing 101 around the pivot axis 103 and in close proximity to the underside of the handle 102.

The sensor board 105 includes a plurality of sensor components 106 thereon. Typically, the sensor components 106 include a Hall-effect device as a component thereof as described infra.

The handle 102 includes a suitably sized magnet 107 (shown schematically) mounted on or at the under surface thereof as shown in the broken away portion of the handle. As will be described, the magnet 107 affects the Hall-effect sensors 106 to produce defined control signals for use by control circuitry (see infra) for indicating the status of the remotely located valve.

As the handle 102 is rotated around the pivot axis 103, the magnet 107 selectively activates one of the Hall-effect sensors 106 to produce a control signal as described infra.

Figure 3:
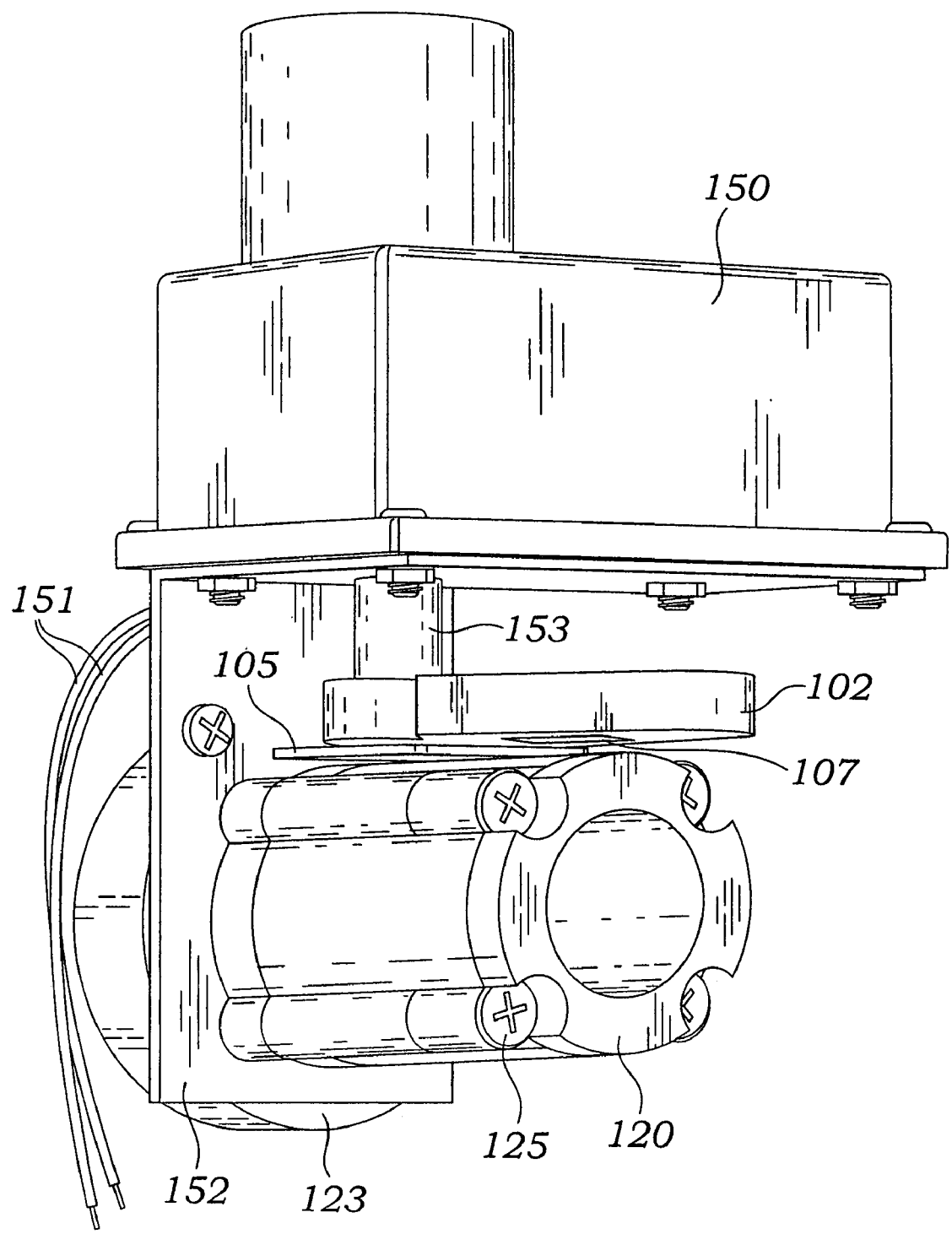
FIG. 3 is another view of a typical valve used in the instant invention including a rotatably mounted handle with an activator and a sensor support panel with sensor devices mounted thereon adjacent to the valve and an optional drive motor connected to the valve.

FIG. 3 is another oblique view of the valve shown in FIG. 2 with an optional drive motor 150 which includes a drive shaft 151 and conductor wires 151. The motor 150 can be mounted to the valve 100 in any suitable fashion as exemplified by the bracket 152. In this embodiment, the drive shaft 153 is adapted to engage the handle 102 or an opening 155 (see FIG. 2) in the handle 102 as preferred. Thus, by selectively activating a switch 12 on the control panel 10, the motor 150, via the shaft 151, can selectively rotate the handle 102 and, thus, operate or position the valve 100. The position of the valve can be indicated and, thus, monitored by the light emitting diodes 11.

Figure 4:
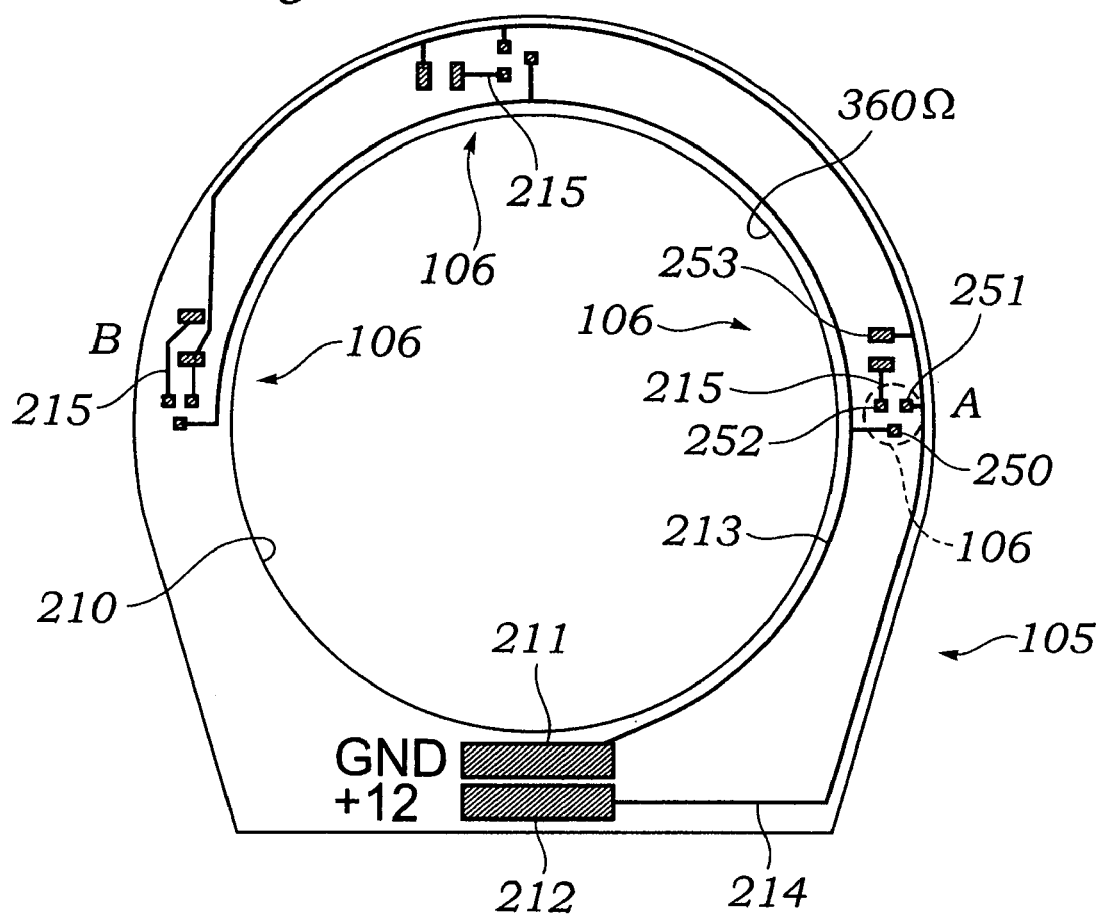
FIG. 4 is a representation of one embodiment of a support panel or substrate with multiple sensor devices mounted thereon.
Figure 4A:
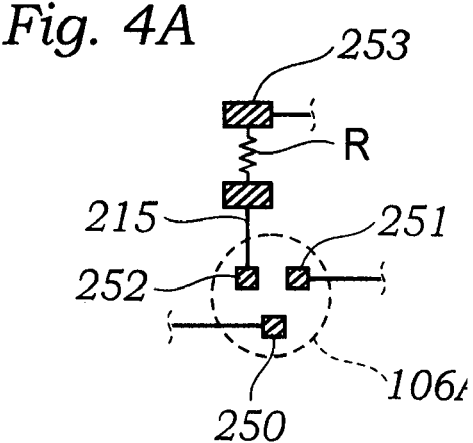
FIG. 4A is a portion of FIG. 4 which is enlarged for convenience.

Referring now to FIGS. 4 and 4A concurrently, there is shown a plan view of one embodiment of a sensor substrate 105. Typically, the sensor substrate is fabricated of a relatively lightweight, electrically insulating material such as, but not limited to conventional printed circuit board (PCB) material such as fiberglass or the like.

The sensor board can be of any convenient (and appropriate) size to accommodate and/or mate with a valve housing 101 and pivot axis 103. While not in any way limited thereto, sensor substrates with central apertures 210 of ½" to 2" have been fabricated of PCB with the thickness of about 1/16".

Fabricated on one surface of the sensor board are typical conductor pads 211 and 212 which are adapted to connect to the cable 30 shown in FIG. 1. The pads 211 and 212 are also connected to conductors designated as a ground line 213 and a voltage line 214, respectively. These conductor lines are disposed at suitable places on the sensor substrate, typically, at the inner and outer edges of the board, respectively.

In the instant embodiment, the sensor board 105 includes three (3) sensors 106 thereon although a different number of sensors is possible. The sensors 106 include discrete components, typically, resistors and a Hall-effect device (see FIG. 5 infra) which are connected to the electrical conductors 213 and 214.

In particular, a resistor is connected between two conductor pads (shown somewhat larger in this depiction) while a Hall-effect sensor 106A is connected to three conductor pads (shown somewhat smaller in this depiction).

More specifically, inputs of the Hall-effect device 106A at location A are connected between the main conductors 213 and 214 at terminals 250 and 251, respectively.

The other Hall-effect sensors at location B and C are similarly connected to the conductors 213 and 214.

A resistor R is connected between the output terminal 252 of the Hall-effect device and the voltage conductor 214 via terminal 253. Likewise, other resistors are connected at the other sensor device.

The resistors included in the respective sensor devices 106 are selected to provide a prescribed voltage drop to control the operation of other portions of the system as described infra.

It should be noted that in a preferred embodiment, the resistors utilized with the sensors 106 at the sides (i.e., locations A and B) of the sensor board (valve closed) are of substantially the same value (for example 360 ohms) while the resistor at the mid-area (i.e., location C) of the sensor board (valve open) is significantly larger (for example 1.000 ohms). Of course, these specific values are illustrative only and are not limitative of the invention. Moreover, the number of the magnetic sensors can be altered, if desired, or dependent upon the valve structure.

Figure 5:
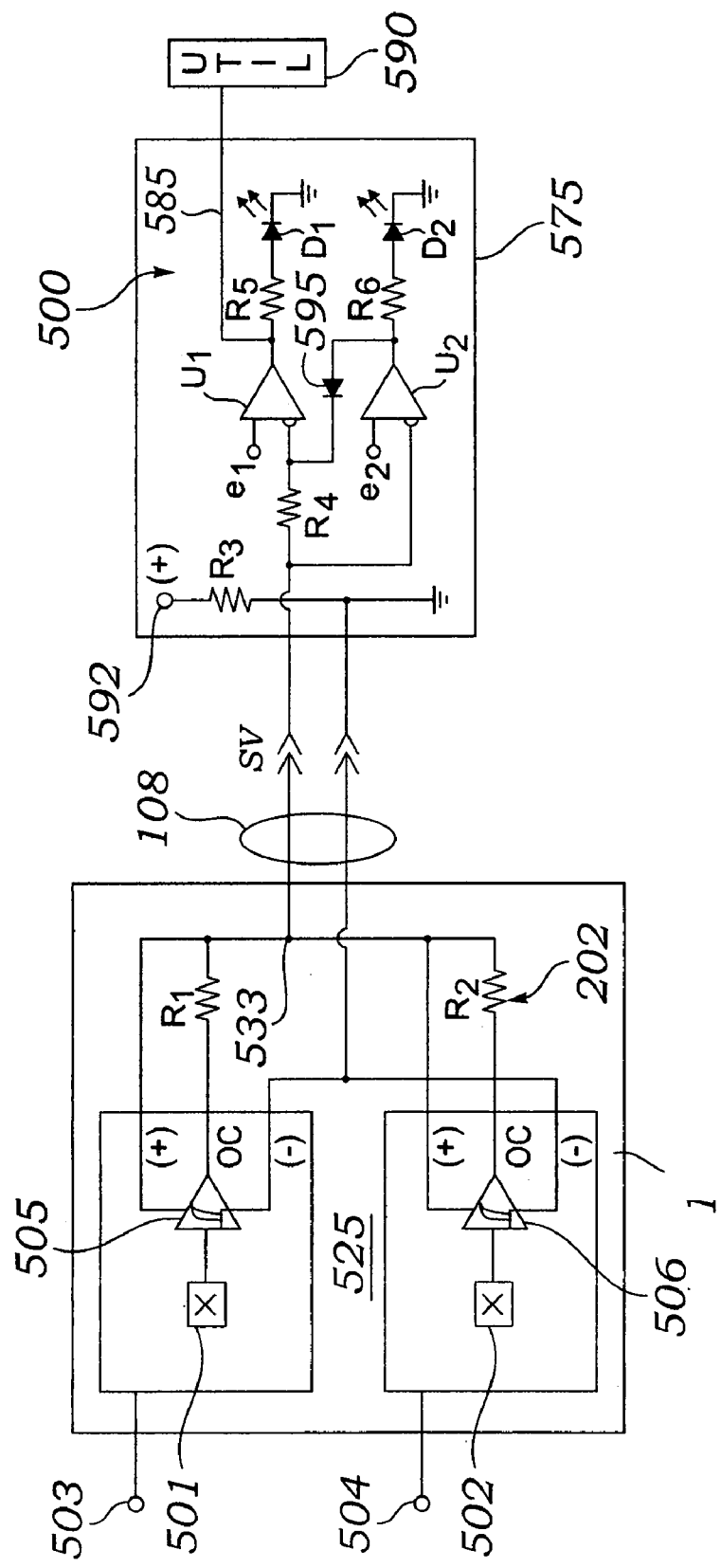
FIG. 5 is a functional block and schematic diagram for one channel of the electronic system of the instant invention.

Referring now to FIG. 5, there is shown a schematic representation of the electrical system of the instant invention. The power for this system is provided from any suitable source such as the 12V DC source which is typical in boats.

For simplicity, in FIG. 5 there is shown only one representative valve board 525 and one display board 500. Several such circuits can be combined on a support board or substrate For convenience, the sensors are identified as sensor 503 (representative of location C and the open position of the valve) and sensor 504 (representative of location A or B and the closed position of the valve) on the substrate shown in FIG. 4. These sensors detect and report the positions of the valve 100 as fully open or completely closed to the control panel 10.

Representative Hall-effect sensor devices 503 and 504 are manufactured and available on the market from Allegro and Honeywell and sold under the A110x family of products which are, preferably, fabricated on a single silicon chip.

These devices, typically, include a voltage regulator, a Hall-effect generator, a small signal amplifier, a Schmitt trigger circuit and an NMOS output transistor. The devices feature fast power-on time and low noise operation with high switch point accuracy without offsets.

As shown, each of the Hall-effect sensor devices 503 and 504 includes a magnetic pickup 501 and 502, respectively. The output of each Hall-effect device, i.e., a magnetic field sensitive device, is connected to a threshold detector 505 and 506, respectively which exhibits hysteresis to provide for smoother operation of the system. A voltage dropping resistor R1 or R2 (described supra) is connected from the output of the respective Hall-effect threshold device 505 and 506 to a common junction 533 representative of the voltage conductor 214 in FIG. 4. (In this simplified circuit representation, resistors R1 and R2 represent the resistors at locations A or B and C in FIG. 4.)

As noted, the representative Hall-effect devices 503 and 504 are mounted on the sensor board 105 at the locations A or B and C (see FIG. 4). In particular, the ground (−) terminal of each detector 505 and 506 is connected to the ground conductor 213, the potential (+) terminal is connected to the +voltage conductor 214, and the output (OC) terminal is connected to the intermediate conductor 215 by conventional PCB wiring techniques and the respective load resistor R1 or R2.

The output terminal 533 of the sensor circuit 525 is connected to the display circuit 500 via a suitable connector cable 108. The cable 108 can be a cable or wireless connection, if desired. Typically, the detector circuit 500 is mounted on a display panel 575 which is of any convenient shape or material and located at any location convenient for the operator. Display panel 575 is, typically, part of the control panel 10 (see FIG. 1).

The voltage needed to operate the sensors 503 and 504 is provided from the positive source 592 via resistor R3 and also is used to produce, in conjunction with resistor R1 or R2, the signal voltage (SV) via the single wire 108 in conjunction with a common ground (or reference) for the system.

In the display circuit 500, comparators U1 and U2 are conventional circuits known in the art. The positive terminals of the comparators U1 and U2 are connected to receive the reference voltages e1 and e2, respectively, which can be supplied by a conventional voltage divider network or other source, as desired.

The inverting input of comparator U2 is connected to the output terminal 533 of sensor circuit 525 to receive the signal voltage SV. The signal voltage SV is also supplied to the inverting input of comparator U1 via resistor R4. The output of comparator U2 is also supplied to the input of comparator U1 via feedback diode 595. The output of comparator U2 is also supplied to light emitting diode (LED) D2 via a current limiting resistor R6.

The output of comparator U1 is supplied to LED D1 via current limiting resistor R5 and, as well, to the optional utilization device 590 via terminal 585. The cathodes of the LEDs D1 and D2 are connected to a suitable reference voltage such as ground.

The signal voltage SV has three possible states. In the first state the voltage level is (+) which indicates that neither of the sensors 503 and 504 is activated and represents that the valve position is indeterminate, i.e. neither fully OPEN nor fully CLOSED.

In a second state, the voltage level at SV is (+) times the ratio of R3/R1 (i.e. +R3/R1) when the magnet 107 is indexed with Hall-effect device in location C (under the handle as seen in FIG. 4) and the valve is fully OPEN.

In the third state, the voltage level is (+) times the ratio of R3/R2 (i.e. +R3/R2) when the magnet 107 is indexed with a Hall-effect sensor in position A or B as shown in FIG. 4 and the valve is fully CLOSED.

In operation, the signal voltage (SV) is provided to the inputs of comparators U1 and U2 and compared to voltages e1 and e2 respectively. While the valve is neither OPEN nor CLOSED, the SV voltage level is high and neither U1 nor U2 is on. In this condition neither light emitting diode D1 nor D2 is on.

When the valve is fully OPEN, the SV level is less than e1 and greater than e2 (because the value of R1 is smaller than R2). Thus, comparator U1 is on. The output signal from comparator U1 is appropriate for illuminating LED D1 and presenting voltage to the optional interlock circuit. A signal is generated at terminal 585 indicating that the valve is in the operating position. This signal at terminal 585 can be supplied to the utility device 590 and used to actuate an interlock circuit and, thus, enables a device such as macerator pump or the like.

When the valve is closed the SV level is less than e1 and e2. As a result, comparator U2 is on thereby producing a voltage for illuminating LED D2. Also, via feed back diode 595, the voltage output from comparator U2 forces comparator U1 and, thus, LED D1 into the off condition.

In a preferred embodiment, display board 500 will support multiple circuits 575 thereon. For example, in one embodiment, up to six such circuits are disposed on a single board for controlling six valves. The number of such circuits is, typically, limited only by the space available on the boards and the number of valves to be monitored.

A number of circuits constructed like circuits 525 and 500 can be utilized in conjunction with each other wherein the respective input and output signals can be provided by or to multiple terminal plugs or jacks. However, a detailed description of only one circuit is provided, the operation of the other circuits being the same. Appropriate connection wires for the signal voltage SV and ground are provided from each valve to terminals on the display panel circuit board 10. The ground wires may be daisy chained from valve to valve, if desired.

The utility circuit 590 controls the application of power to a pump, motor, macerator or the like to assure operation thereof only if the appropriate intake or output valve is opened, e.g., engine start-up is prevented if the cooling water valve is closed.

In operation, the user can mount the smart valve display panel in any desired location to conveniently display the status of any number of valves so that the operation can take appropriate action to adjust the valves accordingly.

Thus, there is shown and described a unique design and concept of a display and controller system. While this description is directed to particular embodiments, it is understood that those skilled in the art may conceive modifications and/or variations to the specific embodiments shown and described herein.

For example, it is contemplated that the valve may incorporate a sliding mechanism rather than a rotating one. In this case, the actuator would be a part of the slide apparatus rather than the rotating handle. This may still be mounted on a planar sensor board.

Any such modifications or variations which are within the purview of this description are intended to be included therein as well. It is understood that the description herein is intended to be illustrative only and is not intended to be limitative. Rather, the scope of the invention described herein is limited only by the claims appended hereto.

The invention claimed is:

1. An adjustable valve for use in a monitoring system comprising,
   positioning means for determining the operational position of said valve,
   support means mounted on said valve adjacent to said positioning means,
   detector means mounted on said support means for producing a signal representative of the position of said positioning means relative to said valve, and
   remote display means for producing an indication of the signal produced by said detector means.

2. The system recited in claim 1 wherein,
   said display means comprises at least one light producing means.

3. The system recited in claim 2 wherein,
   said light producing means comprises a light emitting diode (LED).

4. The system recited in claim 1 wherein,
   said positioning means includes a handle rotatably mounted to the valve.

5. The system recited in claim 4 including,
   actuator means mounted on said handle to selectively activate said detector means.

6. The valve recited in claim 1 wherein,
   said positioning means includes drive means.

7. A valve monitoring system comprising,
   a valve for selectively permitting the flow of a fluid material therethrough,
   said valve comprising a valve body and a handle rotatably mounted to said valve body,
   actuator means mounted to said handle,
   sensor means mounted to said valve body,
   said sensor means operative to respond to said actuator means to produce a signal representative of the position of said rotatable handle, and
   display means responsive to said signal produced by said sensor means indicative of the position of said rotatable handle and the operative status of said valve.

8. The system recited in claim 7 including,
   control means connected to said rotatable handle to selectively adjust the position thereof relative to said valve body.

9. A control system comprising,
   a valve,
   said valve comprising a valve body and a movable component within said valve body,
   actuator means mounted to said movable component to selectively position said movable component within said valve body,
   activator means mounted to said actuator means,
   drive means connected to said actuator means to selectively move said actuator means and said moveable component,
   detector means mounted to said valve body,
   said detector means operative to respond to said activator means to produce a signal indicative of the position of said rotatable handle, and
   display means responsive to said signal produced by said detector means.

10. The system recited in claim 9 wherein,
    said valve is fabricated of non-magnetic material.

11. The system recited in claim 9 wherein,
    said display means comprises at least one light producing means.

12. The system recited in claim 11 wherein,
    said light producing means comprises a light emitting diode (LED).

13. The system recited in claim 9 wherein,
    said detector means includes a support panel mounted on said valve body.

14. The system recited in claim 9 wherein,
    said actuator means includes a rotatable handle connected to said movable component.

15. A valve for use in a remote monitoring system comprising,
    a valve body, a movable component within said valve body and a control element for moving said movable component within said valve body,
    activator means mounted to one surface of said control element,
    sensor means mounted to said valve body in proximity to said activator means,
    said sensor means operative to respond to said activator means to produce a signal representative of the position of said control element, and
    display means responsive to said signal produced by said detector means indicative of the position of said rotatable handle and the operative status of said valve.

16. The valve recited in claim 15 wherein,
    said activator means comprises a magnet, and
    said sensor means comprises a Hall-effect device.

17. The valve recited in claim 15 wherein,
    said control element includes a motor for selectively moving said movable component.

* * * * *